(12) United States Patent
Hoshi

(10) Patent No.: US 6,507,894 B1
(45) Date of Patent: Jan. 14, 2003

(54) INFORMATION PROCESSING APPARATUS AND PROCESS

(75) Inventor: Noritaka Hoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/458,804

(22) Filed: Dec. 10, 1999

(30) Foreign Application Priority Data

Dec. 10, 1998 (JP) .......................................... 10-351361

(51) Int. Cl.$^7$ ............................................. G06F 12/00
(52) U.S. Cl. ..................... 711/137; 711/131; 711/213
(58) Field of Search .............................. 711/137, 204, 711/213, 5, 131, 207, 237

(56) References Cited

U.S. PATENT DOCUMENTS

| | | | | |
|---|---|---|---|---|
| 5,623,632 A | * | 4/1997 | Liu et al. ..................... | 711/122 |
| 5,664,147 A | * | 9/1997 | Mayfield ..................... | 711/122 |
| 5,732,243 A | * | 3/1998 | McMahan ..................... | 711/137 |
| 5,740,399 A | * | 4/1998 | Mayfield et al. ............. | 711/122 |
| 5,758,119 A | * | 5/1998 | Mayfield et al. ............. | 711/122 |
| 5,778,436 A | * | 7/1998 | Kedem et al. ............... | 711/122 |
| 5,784,711 A | * | 7/1998 | Chi ............................. | 711/123 |
| 5,918,045 A | * | 6/1999 | Nishii et al. ................. | 711/213 |
| 6,134,643 A | * | 10/2000 | Kedem et al. .............. | 711/137 |
| 6,141,732 A | * | 10/2000 | Adams ........................ | 711/137 |
| 6,173,392 B1 | * | 1/2001 | Shinozaki .................... | 711/213 |
| 6,314,472 B1 | * | 11/2001 | Trieu et al. .................... | 710/15 |

FOREIGN PATENT DOCUMENTS

| | | | | |
|---|---|---|---|---|
| JP | 62-1067 | 1/1987 | ......... | G06F/15/347 |
| JP | 63-98749 | 4/1988 | ........... | G06F/12/08 |
| JP | 1-142959 | 6/1989 | ........... | G06F/12/10 |
| JP | 1-251273 | 10/1989 | ......... | G06F/15/347 |
| JP | 2-224043 | 9/1990 | ........... | G06F/12/08 |
| JP | 6-19957 | 1/1994 | ......... | G06F/15/347 |
| JP | 8-194615 | 7/1996 | ............. | G06F/9/38 |
| JP | 8-286928 | 11/1996 | ............. | G06F/9/45 |

OTHER PUBLICATIONS

Japanese Office Action fax dated Mar. 5, 2002, with partial translation, author unknown, Japanese patent application not identified.

Nakamura, et al., "Evaluation of Pseudo Vector Processor Based on Register Window", vol. 34, No. 4, Apr. 1993, pp. 669–679.

Inoue, et al., "Hardware of the SX–4 Series", vol. 48, No. 11, 1995, pp. 13–22.

* cited by examiner

Primary Examiner—Matthew Kim
Assistant Examiner—Stephen Elmore
(74) Attorney, Agent, or Firm—McGinn & Gibb, PLLC

(57) ABSTRACT

In a processor having a cache memory, a mechanism is provided which efficiently realizes pre-fetch/post-store for the cache memory of a large quantity of data arrayed with stride (i.e., a regular increment) on a main memory. A cache memory is provided with plural ports. A first input/output port is connected to a cache memory controller of a processor core. A second input/output port is connected to a pre-fetch/post-store circuit outside the processor core. A portion of a memory area of the cache memory is associated with a specified physical space area of a main memory device in a one-for-one correspondence and is designed as a pre-fetch/post-store cache area dedicated to the specified physical space area. For the pre-fetch/post-store cache area, the pre-fetch/post-store circuit transfers data directly with the main memory device without interfering with the cache memory controller within the processor core.

32 Claims, 5 Drawing Sheets

INFORMATION PROCESSING APPARATUS AND PROCESS

FIELD OF THE INVENTION

This invention relates to an information processing apparatus having a cache memory for holding a copy of the contents of a main memory and an information processing process.

BACKGROUND OF THE INVENTION

In a micro-processor, a cache memory of a small capacity and a high speed is placed in the vicinity of a processor to speed up frequently performed memory accessing to reduce the entire run time.

However, if large scale data is to be handled, data transfer between a cache memory and the main memory occurs frequently such that frequently used data may be expelled from the cache memory to lower the performance. Moreover, in the cache memory, since plural data arranged in succession on the main memory are usually grouped into a line and the data are exchanged with the main memory on the line basis, there are occasions wherein unneeded data are introduced into the cache memory. This reduces the effective cache memory capacity to lower the performance additionally.

In actuality, in the field of a supercomputer, the cache memory is not used on accessing large scale data and the data is directly introduced into a register from the main memory. However, in this case, a large number of registers are required in order to hide the comparatively long latency required in data transfer between the main memory and the register.

For example, in a vector supercomputer SX-4, manufactured by NEC, such a technique is used in which a vector register of a large capacity is provided in the processor and, if large scale data is to be accessed by the processor, the data is directly introduced from the main memory to the register and the processor excutes computations on the data in the vector register. Although the cache memory is used for data accessing from a scalar processor, the vector processor does not access data in the cache memory (see M. Inoue, K. Owada, T. Furui and M, Katagiri, Hardware of the SX-4 Series, NEC Technical Journal, Vol. 48, No. 11, pp. 13 to 22, 1995).

In a treatise by Nakamura et al. (H. Nakamura, H. Imori and K. Nakazawa, Evaluation of Pseudo Vector Processor Based on a Register Window, Translation of the Information Processing Society of Japan, Vol. 34, No. 4, pp. 669 to 679, 1993), there is disclosed a technique of efficiently executing computations in the scientific application in a microprocessor. Here, plural registers are provided, and data of the main memory is directly loaded into a separate register set during execution of the computations, and data of a separate register set is directly stored into the main memory. Here again, the cache memory is by-passed in accessing the large scale data, and data is directly exchanged between the register and the main memory.

The above-described techniques, having the function of by-passing the cache memory in accessing the large-scale data to transfer data directly between the main memory and the register, and which are provided with a large number of registers in the processor in order to hide the longer latency required in data transfer between the main memory and the register, for evading the lowering in the performance ascribable to cache memory characteristics, is herein termed a first conventional technique.

In the JP Patent Kokai JP-A-8-286928, there is disclosed a technique of efficiently loading discretely arrayed data in a cache memory. Here, the data arranged discretely on the main memory with a certain regularity is collected by an address conversion device. The collected data are re-arrayed as a sequence of data having consecutive addresses. Since the program has access to the re-arrayed data, the cache memory may hold only data required by the processor, so that it may be expected to realize efficient use of the cache memory and efficient use of the bandwidth between the cache memory and the main memory. This technique is herein termed a second conventional technique.

SUMMARY OF THE DISCLOSURE

However, various problems have been encountered in the course of the investigations toward the present invention. For instance, the first conventional technique has an inconvenience that a unit must be provided in the processor to bypass the cache memory and a large number of registers need to be provided for hiding the effect of the memory latency. Therefore, specialized, dedicated microprocessor components are needed, all of which enlarge the circuit.

In the second conventional technique, the following three problems are not resolved.

The first problem is that of cache pollution, i.e., data subsequently to be used is expelled from the cache when data is loaded on a large scale. If the expelled data is again requested by the processor, cache mis-hit occurs, such that the processor must again request data outside the large block of data just loaded. If this occurs frequently, the data transfer between the processor and the main memory device could become excessive and exceed the bandwidth of the channel, thus possibly lowering the performance of the processor system.

The second problem is that, while data copying from the main memory to the cache memory occurs on the cache line basis, this data copying is necessarily started by cache mis-hit, thus increasing the average latency since the time the processor requires data until the data becomes available.

The third problem is that, while a processor core has a low-speed interface on the main memory side and a high-speed interface on the cache memory side, the copying from the main memory to the cache memory occurs via a cache memory controller in the processor core, so that the copying speed is governed by the low-speed interface between the main memory and the processor core.

It is therefore an object of the present invention to provide an information processing apparatus and process in which pre-fetch/post-store between the main memory data and the cache memory is realized efficiently.

Other objects of the present invention will become apparent in the entire disclosure.

An information processing apparatus according to an aspect of the present invent ion has a main memory device, a cache memory for holding a copy of the main memory device, and a processor including a cache memory controller designed to supervise data in the cache memory as the apparatus refers to and updates control information and address information in the cache memory. The information processing apparatus includes pre-fetch unit designed to transfer data in the main memory device to the cache memory without having reference to nor updating the control information and the address information.

The processor has a physical address space area, inclusive of a specified physical space area associated with a specified area on the cache memory in a one-for-one correspondence. The pre-fetch unit directly transfers data between the cache memory and the main memory device, under a command for memory copying for the specified physical space area without obstructing execution of processing by the processor.

The cache memory has a first input/output port and a second input/output port. The first input/output port is connected to the main memory device via the cache memory controller of the processor. The second input/output port is connected to the main memory device via the pre-fetch unit.

The pre-fetch unit copies consecutive or discrete data arrayed at a fixed interval on the main memory device in consecutive areas on the cache memory. The pre-fetch unit copies a sequence of data arrayed in addresses on the main memory device specified by pointers into consecutive areas on the cache memory. The pointers are consecutive or discrete data arrayed at a fixed interval on the main memory device. The pre-fetch unit copies a sequence of data arrayed in addresses on the main memory device specified by pointers into consecutive areas on the cache memory. The pointers are data arranged consecutively in specified areas on the cache memory.

An information processing apparatus according to a second aspect of the present invention has a main memory device, a cache memory holding a copy of the main memory device, and a processor including a cache memory controller designed to supervise data in the cache memory as the apparatus refers to and updates the control information and the address information in the cache memory. The information processing apparatus includes a post-store unit designed to transfer data in the cache memory to the main memory device without having reference to nor updating the control information and the address information.

The processor has a physical address space area, inclusive of a specified physical space area associated with a specified area on the cache memory in a one-for-one correspondence. The post-store unit directly transfers data between the cache memory and the main memory device, under a command for memory copying for the specified physical space area, without obstructing execution of processing by the processor.

The cache memory has a first input/output port and a second input/output port, with the first input/output port being connected to the main memory device via the cache memory controller of the processor and with the second input/output port being connected to the main memory device via the post-store unit.

The post-store unit copies data arrayed in consecutive areas on the cache memory in addresses specified at a fixed interval on the main memory device. The post-store unit copies a sequence of data arrayed in consecutive areas on the cache memory into addresses on the main memory device specified by pointers. The pointers are consecutive or discrete data arrayed at a fixed interval on the main memory device. The post-store unit copies data arrayed in consecutive areas on the cache memory into addresses on the main memory device specified by pointers. The pointers are again data arranged consecutively in specified areas on the cache memory.

According to a third aspect of the present invention, there is provided an information processing apparatus, which includes a processor designed to set a specified block of a plurality of blocks making up a cache memory as a pre-fetch/post-store cache area, to set a specified physical main memory space area of plural physical main memory space areas associated with the pre-fetch/post-store cache area as a pre-fetch/post-store physical space area and to set portions of the plural physical main memory space areas other than the pre-fetch/post-store physical space area as an access-inhibited area to control the pre-fetch/post-store cache area as a cache area dedicated to the pre-fetch/post-store physical space area, and a pre-fetch/post-store circuit designed to re-array a sequence of data existing consecutively or discretely on the main memory device as a sequence of consecutive data on the pre-fetch/post-store cache area directly without interposition of a cache controller of the cache memory. An application program employing the sequence of data existing consecutively or discretely on the main memory device are structured to access the re-arrayed data.

The pre-fetch/post-store circuit re-writes the sequence of data on the pre-fetch/post-store cache area directly in consecutive or discrete sites on the main memory device, without interposition of a cache controller of the cache memory, after an end of use by the application program of the re-arrayed data.

More specifically, the information processing apparatus of the present invention includes a cache memory having plural input/output ports, and a pre-fetch/post-store circuit capable of having direct access only to the cache data information without having reference to nor updating the control/address information in the processor core. A specified physical address area is procured as a pre-fetch/post-store area and the specified physical address area is mapped to the specified area on the cache memory in a one-for-one correspondence under software control. The pre-fetch/post-store circuit causes data to be transferred directly between the main memory and the cache memory under a command from the processor core.

The pre-fetch/post-store circuit has the function of copying data arrayed in consecutive or discrete areas on the main memory into consecutive areas on the cache memory and of copying the data arranged on consecutive areas on the cache memory in consecutive or discrete areas into the main memory. In particular, in the configuration of copying the data arrayed in discrete areas on the main memory into consecutive areas on the cache memory, there is no necessity of loading unneeded data in the cache memory to enable the cache memory to be used efficiently.

According to a further aspect of the present invention, there is provided an information processing process, typically using the aforementioned apparatus.

The process is characterized by comprising pre-fetching data in said main memory device by transferring the data in said main memory device to said cache memory without having reference to nor updating said control information and said address information.

Other features of the process are mentioned in the claims, the entire disclosure relating to the process being herein incorporated by reference thereto.

Also the process aspects are fully disclosed in association with the disclosure relating to the apparatus.

Thus, according to the present invention, the sequence of data arrayed consecutively or discretely on the main memory device for use by the application program can be copied into specified consecutive areas on the cache, without having reference to/updating the information managed by the cache memory controller by the pre-fetch/post-store circuit outside the processor core. Alternatively, the data arranged in specified consecutive areas on the cache can be written in consecutive or discrete areas on the main memory device without having reference to/updating the information managed by the cache memory controller by the pre-fetch/post-store circuit outside the processor core.

BRIEF DESCRIPTION OF THE DRAWINGS

FIG. 5 shows an illustrative FORTRAN program executed by the apparatus of FIG. 4.

PREFERRED EMBODIMENTS OF THE INVENTION

Figure 1:
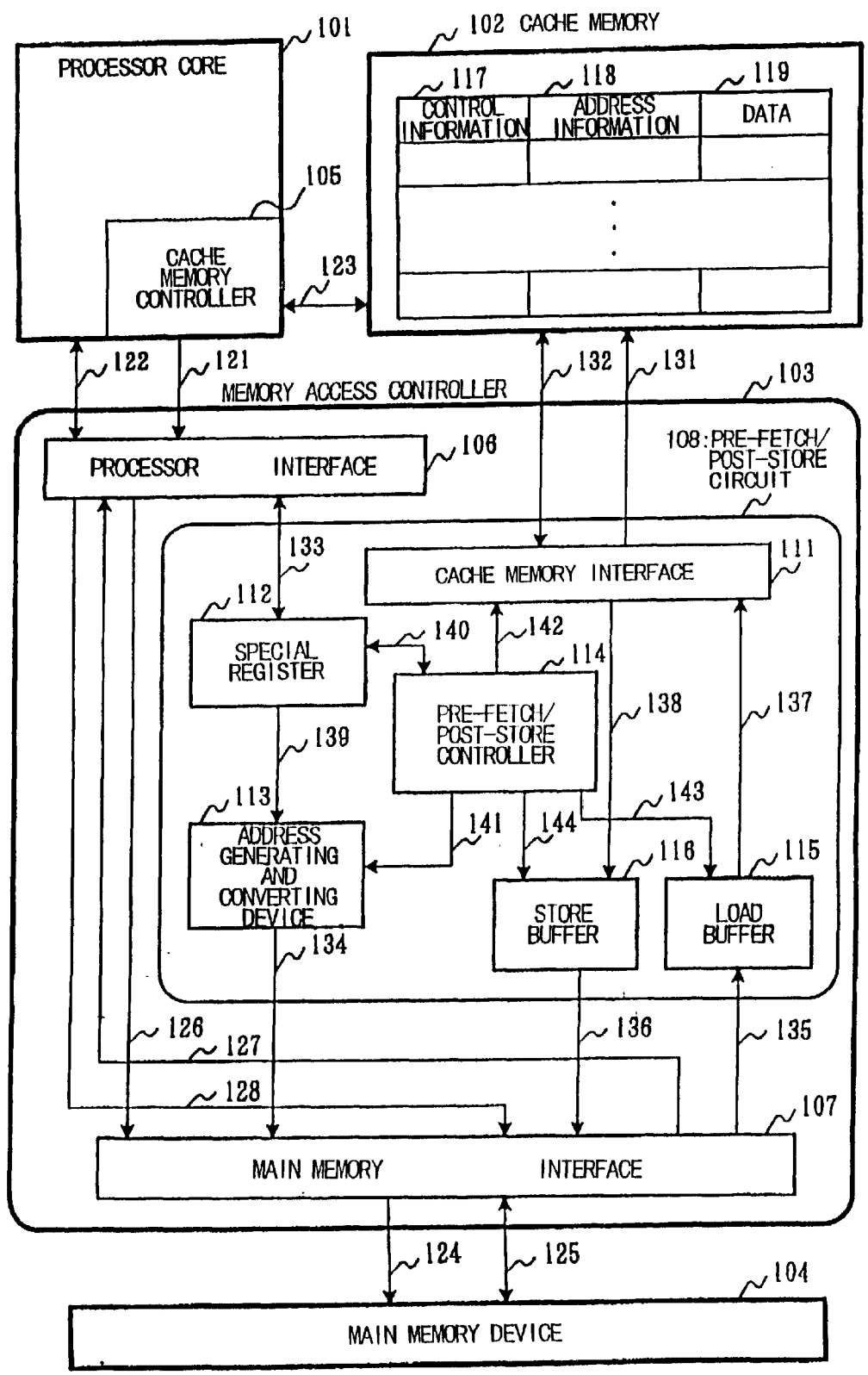
FIG. 1 is a block diagram showing essential portions of an information processing apparatus according to an embodiment of the present invention.

Referring to the drawings, preferred embodiments of the present invention are explained in detail.

FIG. 1 shows a block diagram showing essential portions of the information processing apparatus embodying the present invention. In FIG. 1, a processor core 101 is a routine processor core portion made up of a computing pipeline, a register set and a cache memory controller 105. In FIG. 1, the components other than the cache memory controller 105 are not shown. The processor core 101 is connected over a processor address bus 121 and a processor data bus 122 to a processor side interface 106 in a memory access controller 103. The processor core 101 is also connected via the cache memory controller 105 therein to a first input/output port of cache memory 102 holding a copy of the main memory over a cache access bus 123. If the processor uses plural cache memories hierarchically, the cache memory 102 denotes that one of the cache memories in use in the sole processor that is closest to the main memory. Also, a main memory device 104 is connected over a main memory address bus 124 and a main memory data bus 125 to a main memory device side interface 107 within the memory access controller 103. Within the memory access controller 103, the processor side interface 106 and the main memory device side interface 107 are interconnected over a memory controller address bus 126, a memory controller read bus 127 and a memory controller write bus 128.

The cache memory 102, holding a copy of the main memory data, is a high-speed memory for grouping plural data, arranged in succession on a main memory, as one block or line, and for supervising (or managing) the block of data. In the present embodiment, the cache memory 102 has first and second input/output ports. Within the cache memory 102, there are plural lines, for each of which there are provided address information 118 for indicating at which address on the main memory the data 119 is located and control information 117 for indication the state of the data 119 on the line. The control information 117 indicates whether the data on the line is valid or invalid, whether the data on the line is coincident with the contents in the main memory, and so on. The configuration of the lines in the cache memory 102 as well as the contents of the control information are the same as those of the conventional cache memory.

In executing commands of the main memory access, the processor core 101 first accesses the cache memory controller 105. The cache memory controller 105 accesses the control information 117 and the address information 118 to check whether or not there exists a copy of the main memory in the cache memory 102. If there is such copy, the cache memory controller 105 causes data to be read or written over the cache access bus 123 to up date the control information 117 when necessary. If there is no copy in the cache memory 102, the cache memory controller 105 accesses the main memory device 104. When writing data, the cache memory controller 105 delivers the address to the main memory over the processor address bus 121, address bus 126 and the main memory address bus 124 to write data in the main memory device 104 over the processor data bus 122, write bus 128 and the main memory data bus 125. When reading out data, the cache memory controller 105 delivers the address to the main memory over the processor address bus 121, address bus 126 and the main memory address bus 124 to read out data from the main memory device 104 over the main memory data bus 125, read bus 127 and the processor data bus 122. During execution of these operations, the control information 117, address information 118 and data 119 of the cache memory 102 are updated when necessary. So far, the operation is similar to that of a routine processor.

The present embodiment is further provided with a pre-fetch/post-store circuit 108.

The pre-fetch/post-store circuit 108 is connected over a cache address bus 131 and a cache data bus 132 to a second input/output port of the cache memory 102. The pre-fetch/post-store circuit 108 is connected over a pre-fetch/post-store address bus 134, a pre-fetch read bus 135 and a post-store write bus 136 to the main memory device side interface 107, while being connected over a special register access bus 133 to the processor side interface 106.

The pre-fetch/post-store circuit 108 includes a special register 112 that allows a commanding of the pre-fetch/post-store address from the software, an address generating and converting device 113 that allows a generating of a physical address from a parameter commanded by the special register 112, and a cache memory interface 111. The pre-fetch/post-store circuit 108 also includes a load buffer 115 for holding pre-fetch data, a store buffer 116 for holding post-store data, and a pre-fetch/post-store controller 114.

The special register 112 is connected over the special register access bus 133 to the processor side interface 106, while being connected over an address command signal line 139 to the address generating and converting device 113. The address generating and converting device 113 is connected over the pre-fetch/post-store address bus 134 to the main memory device side interface 107. The load buffer 115 is connected over a pre-fetch read bus 135 to the main memory device side interface 107, while being connected over a pre-fetch read bus 137 to a cache memory interface 111. The store buffer 116 is connected over a post-store write bus 136 to the main memory device side interface 107, while being connected over a post store write bus 138 to the cache memory interface 111. The cache memory interface 111 is connected over the cache address bus 131 and the cache data bus 132 to the cache memory 102. The pre-fetch/post-store controller 114 is connected to the special register 112, address generating and converting device 113, cache memory interface 111, load buffer 115 and to the store buffer 116 over a special register control line 140, an address generating and converting control line 141, a cache memory interface control line 142, a load buffer control line 143 and a store buffer control line 144, respectively.

Figure 2:
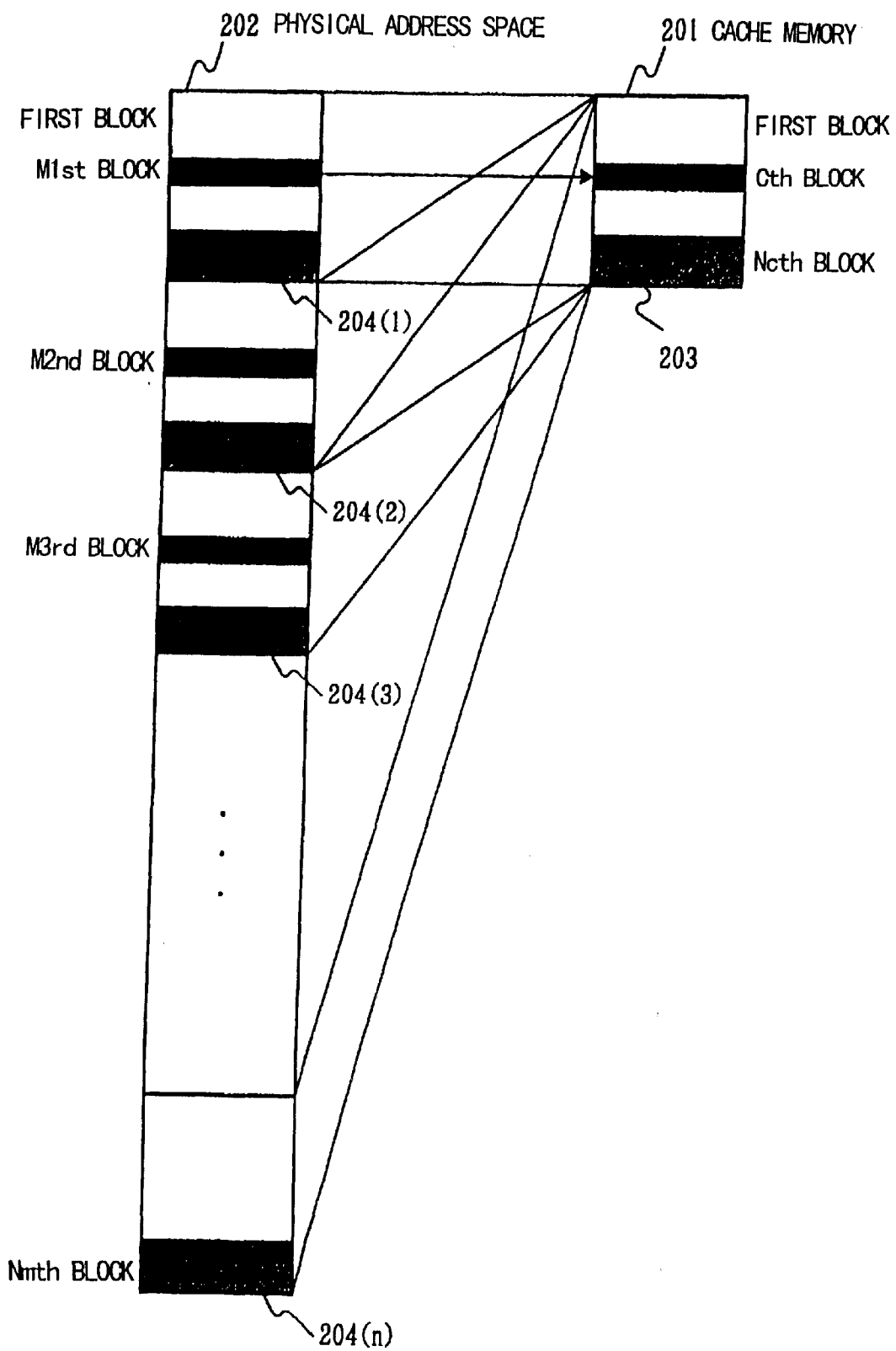
FIG. 2 is a memory image diagram of the information processing apparatus of the embodiment shown in FIG. 1.

FIG. 2 diagrammatically shows an image of the physical address space mapped to the cache memory in one embodiment of the present invention. This embodiment shows a physical cache that is the directly mapped. A cache memory 201 is made up of Nc blocks, numbered from 1 to Nc. If a physical address space 202 is divided into blocks of the same size as those of the cache memory 201, the respective blocks can be numbered from 1 to Nm. A copy of data stored in the M1st block of the physical address space 202 is stored in the Cth block of the cache memory 201 specified by C=(M1 mod nc). The Cth block of the cache memory 201 is associated with the M1st block, M2nd block and the M3rd block and so forth of the physical address space 202, such that the same block of the cache memory 201 are co-owned (or shared) by these plural blocks of the physical address space 202.

In the present embodiment of the present invention, control is made so that only a specified area on a cache indicated as being a pre-fetch/post-store area is associated with the physical address space in a one-for-one correspondence. Specifically, a specified area 203 on the cache memory 201 is set as a pre-fetch/post-store cache area and control is so made that, of the associated physical address spaces 204(1) to 204(n), the address space 204(1) is set as a pre-fetch/post-store physical space area, with the other spaces 204(2) to 204(n) being use-inhibited areas. If the cache memory size is sufficiently larger than the size with which the processor controls the address space, that is the page size, this use inhibited area can be set on the page basis.

Except the first accessing directly after the system startup, the processor's access to the pre-fetch/post-store physical space area 204(1) is completed at all times on the cache, in order to accommodate the pre-fetch/post-store cache area 203 of the cache memory 201. That is, cache hit perpetually occurs. On the other hand, since the accessing to the areas corresponding to the physical spaces 204(2) to 204(n) is inhibited, there is no necessity of implementing a main memory device which is adapted for accommodating the physical spaces 204(2) to 204(n).

By placing limitations on the use of the physical address spaces, it becomes possible to control the accessing to the specified cache area solely by software.

Figure 3:
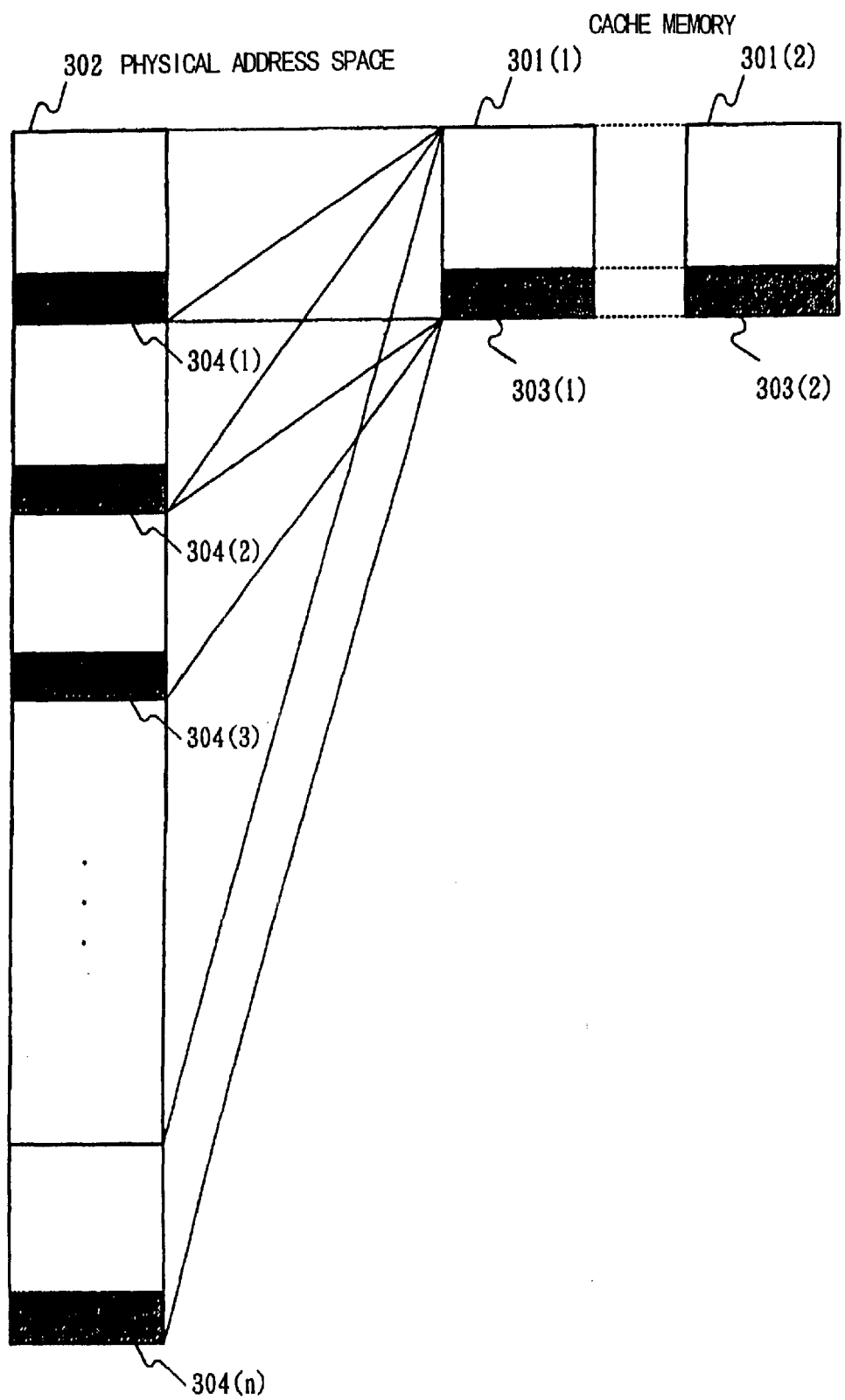
FIG. 3 is another memory image diagram of the information processing apparatus of the embodiment shown in FIG. 1.

FIG. 3 shows a mapping example of the cache memory and the physical address space in case the cache is two-way set associative. The cache memory is made up of cache memory areas 301(1) and 301(2), such that an optional area on a physical space 302 is copied on any area on the cache memory areas 301(1) and 301(2). It is noted that areas 304(1) to 304(n) on the physical space 302 are associated with specified areas 303(1) to 303(2) on the cache memory. If, in this case, the specified areas 303(1), 303(2) are set as pre-fetch/post-store cache areas, it suffices if the areas 304(1) and 304(2) are specified as pre-fetch/post-store physical space areas and the areas 304(3) to 304(n) are specified as use inhibited areas. How the areas 303(1), 303(2) and the areas 304(1), 304(2) are associated can be confirmed upon initialization by the taking, e.g., the following procedure:

First, the processor core 101 writes respective different dummy data in the pre-fetch/post-store physical space areas 304(1) and 304(2). At this time, the data is written actually in the pre-fetch/post-store cache areas 303(1), 303(2), while the main memory accessing is completed in the cache memory 102. It is noted that, although accessing to the main memory device 104 may be commanded depending on a protocol for the cache memory controller 105, it is possible for the memory access controller 103 to disregard this command. The cache memory interface 111 then reads out the dummy data written in the cache memory 102 and compares the read-out data to the written data to confirm the correspondence between 303(1), 303(2) and 304(1), 304(2). Since block replacement (rearrangement or rewriting) subsequently does not occur in the cache memory 102, the relation of correspondence, once confirmed, is maintained.

The operation of the present embodiment, configured as described above, is explained in the order of explaining pre-fetching first and followed by explaining post-storing.

Before executing the application program, the control information 117 and the address information 118 of the totality of lines contained in the pre-fetch/post-store areas of the cache memory 102 (203 in FIG. 2 and areas 303(1) and 303(2) in FIG. 3) are set by the software, such as OS. This setting is effected by accessing once, such as read-accessing, the pre-fetch/post-store physical space area 204(1) in FIG. 2 and the pre-fetch/post-store physical space areas 304(1) and 304(2) in FIG. 3, through the cache memory controller 105, by the software, such as OS. On system startup, the control information 117 of the respective line(s) contained in the pre-fetch/post-store area of the cache memory 102 indicates "invalid". However, at the time of the read accessing, the contents of the pre-fetch/post-store physical space area 204(1) in the case of FIG. 2 and the contents of the pre-fetch/post-store physical space areas 304(1), 304(2) in the case of FIG. 3 are stored in the data 119 of the respective line(s), the address information 118 is set and the control information 117 is set to "valid" by the processing of the cache memory controller 105 accompanying the cache mis-hit. From this time on, the address information 108 of the respective lines in the pre-fetch/post-store areas are not rewritten, with the control information 117 of the respective line(s) indicating "valid" at all times.

The operation of the memory access controller 103 pre-fetching the large amount of data arranged with stride (regularity) on the main memory device 104 is now explained. The stride herein denotes that the data is arrayed, e.g., as in the instant embodiment, at a fixed interval. In such case, the reference data of the nth (n=0,1,2, ...) data can be represented by an equation:

$$(\text{reference address}) = (\text{start address}) + \text{stride}(\text{regularity}) \times n$$

The present embodiment is directed to the case in which the reference address can be calculated in accordance with the stride that can be represented by this equation. If the value of the stride corresponds to one unit data, the reference address becomes a contiguous address to permit pre-fetch of consecutive data on the main memory. On the other hand, if the value of the stride corresponds to two or more units data, the reference address becomes a discrete address to enable pre-fetch of discrete data on the main memory.

Direct data transfer from the main memory device 104 to the cache memory 102 in the present embodiment is realized by hardware and software operating in concert. First, the software executes the following two processing operations prior to execution of pre-fetch.

One of the processing operations is setting the information necessary for pre-fetch in the pre-fetch/post-store circuit 108. The other is setting a flag for confirming the end of pre-fetch in a data area on the cache memory 102.

First, the setting of the pre-fetch information is explained. The information necessary for pre-fetch is the information on how the data is arranged on the main memory device 104 and the information as to in which area of the cache memory 102 data can be written. These information items are set by software in the special register 112 of the pre-fetch/post-store circuit 108. Among the methods for the software to set values in the special register 112, there are methods such as a method of expanding instruction set and a method for the processor core 101 to issue a store command to a non-cache area or to issue input/output command. In the instant embodiment, the method for the processor core 101 to issue a store command to the non-cache area is used. The special register 112 is a place therein to store the following information necessary for pre-fetch:

type of accessing (pre-fetch);

virtual address of data arraying start on a main memory;

regularity (stride) of data arrangement on the main memory;

number of data;

units of data, such as bytes or words;

store start position on the cache memory;

position of a flag confirming the pre-fetch end; and pre-fetch start permitting bit.

The instant embodiment is directed to a case where data is arrayed at a fixed interval. The stride in data arraying means amount of address increment or decrement. Since some applications access plural arrays simultaneously, the special register is structured to record plural sets of the above contents. The setting of these information items is issued as a store command to the non-cache area under a command of a software executing on the processor core 101. The store command is directly sent via the processor address bus 121 and the processor data bus 122 to the processor side interface 106 without passing through the cache memory controller 105. The processor side interface 106 discriminates, from the address specified by the processor address bus 121, whether or not the command is the data setting command to the special register 112. If the result of check is YES, the relevant value is set via special register access bus 133 on the special register 112.

Next, the flag setting for confirming the pre-fetch end is explained. The pre-fetch in the present invention is processed by the pre-fetch/post-store circuit 108 outside the processor core 101 independently from an instruction stream executed by the processor core 101. Therefore, the software processed by the processor core 101 needs to confirm the end of pre-fetch before using the pre-fetched data. For this confirmation, the present embodiment uses a flag on the cache memory 102. The data on the cache memory 102 is usually updated automatically by processing a software by the processor core 101 and hence cannot be used for synchronized processing with other circuits. However, in the present embodiment, since the pre-fetch/post-store circuit 108 has a unit designed to directly rewrite the data on the cache memory 102 without interposition of the cache memory controller 105, high-speed synchronized processing on the cache memory 102 becomes possible. The software executed on the processor core 101 resets a flag set at a specified position on the cache prior to start of pre-fetch. This specified position is part of the pre-fetch/post-store cache area and is not updated (rewritten) automatically as a result of the software execution. The reference of the flag is executed as memory accessing by the software.

The pre-fetch start permitting bit of the special register 112 is a bit which commands the pre-fetch/post-store controller 114 to start the pre-fetch. When this bit is set, pre-fetch start is commanded to the pre-fetch/post-store controller 114 via the special register control line 140, such that the pre-fetch is executed under control by the pre-fetch/post-store controller 114. That is, the pre-fetch start permitting bit is set after end of the setting of the other items of the pre-fetch information. First, the pre-fetch/post-store controller 114 sends the pre-fetch information set on the special register 112 to the address generating and converting device 113 via the address command signal line 139. On the other hand, the pre-fetch/post-store controller 114 receives the number of data on the special register 112 over the special register control line 140 and communicates it over the load buffer control line 143 to the load buffer 115, which then records the value.

The address generating and converting device 113. generates the virtual address of the data of a target for the pre-fetch and converts the virtual address to the physical address. The generated address is sent over the pre-fetch/post-store address bus 134 to the main memory device side interface 107 and over the main memory address bus 124 to the main memory device 104. The main memory device 104 outputs data corresponding to the received address over the main memory data bus 125 to the main memory device side interface 107. This data is stored via the pre-fetch read bus 135 in the load buffer 115. The address generating and converting device 113 adds the virtual address of the start of the data array and the stride of the data array to each other to generate the pre-fetch virtual address sequentially, which is further converted into the physical address. The as-converted physical address is sequentially sent via the pre-fetch/post-store address bus 134 to the main memory device side interface 107. The ensuing processing is similar to the first data pre-fetch. In this manner, plural data arrayed with stride on the main memory are pre-fetched to the load buffer 115. This processing is repeated a number of times equal to the number of data on the special register 112.

The load buffer 115 temporarily holds the pre-fetched data and subsequently groups plural data together to write the data in the cache memory 102. The cache memory 102 holds the control information 117, address information 118 and the plural data 119 as one set. The size of the data 119 that can be stored in this one set is termed a line or block size. The load buffer 115 groups a quantity of data equal to the line size together to send the data over the pre-fetch read bus 137 to the cache memory interface 111. The cache memory interface 111 receives the storestart position on the cache memory, recorded in the special register 112, over the special register control line 140, pre-fetch/post-store controller 114 and the cache memory interface control line 142 to write the received data on a line specified on the cache memory 102. This writing is performed via the cache address bus 131 and the cache data bus 132. When writing pre-fetch data on the cache memory 102, the pre-fetch/post-store controller 114 adds a value equal to the line value in the information on the special register 112 (storestart position on the cache memory). This processing is executed until the data pre-fetch is completed in its entirety. The number (or volume) of data to be pre-fetched is recorded on the load buffer 115 and is compared to the number (or volume) of the pre-fetched data. When the two coincide, the commanded data pre-fetch is decided to have come to a close. If the data pre-fetch has come to a close, the data is directly written in the cache memory 102 even if the number of data in the load buffer 115 is short of the data corresponding to the one line size in the cache memory 102.

When the writing of the entire pre-fetch data in the cache memory 102 has come to a close, the pre-fetch/post-store controller 114 sets a flag confirming the end the pre-fetch. The flag for confirming the end of the pre-fetch has been set on the cache memory 102, its position being recorded in the special register 112. The pre-fetch/post-store controller 114 commands the flag setting to the cache memory interface 111 over the cache memory interface control line 142. The cache memory interface 111 sends data over the cache address bus 131 and the cache data bus 132 to the cache memory to set the flag at the specified position. Finally, the pre-fetch/post-store controller 114 commands the special register 112 to erase the pre-fetch information set on the special register, 112.

The software executed on the processor core 101 checks a flag for confirming the end of the pre-fetch asset on the cache memory 102 and, after confirming the end of the pre-fetch, starts the accessing to the pre-fetched data. It is noted that the pre-fetch/post-store circuit 108 has copied the consecutive or discrete data on the main memory in consecutive areas into the pre-fetch/post-store cache area on the cache memory 102. The pre-fetch/post-store cache area (203 in FIG. 2 and 303(1), 303(2) in FIG. 3) corresponds to pre-fetch/post-store physical space area (204(1) in FIG. 2 and 304(10 and 304(2) in FIG. 3). Although not shown in FIG. 2, 3, the pre-fetch/post-store physical space area (204(1) and 304(1), 304(2)) are associated with certain virtual address space area. If this virtual address space area is denoted K, the correspondence between K and the associated physical address space area is set by OS in a well-known manner. Data transfer by the pre-fetch/post-store circuit 108 to the pre-fetch/post-store cache area means re-arraying the data in the virtual address space area K. Therefore, if accessing the pre-fetched data, the application program accesses the area K. The address is converted to an associated area in the physical address space area (204(1) in FIG. 2 and 304(1), 304(2) in FIG. 3) so that the pre-fetch/post-store cache area of the cache memory 102 can be accessed.

In the present embodiment, since the sequence of pre-fetched data is re-arrayed in the virtual space area K, the application program is re-written to be referenced to the re-arrayed address (address on K), as described in more detail in the JP Patent Kokai JP-A-8-286928.

In the present embodiment, as described above, it becomes possible to pre-fetch part of the large-scale data in a specified area in the cache memory 102 under a command by the software. Thus, the following meritorious effects are derived:

Since a sequence of data on the main memory is pre-fetched to a specified area on the cache, data hits perpetually on the cache when the application program performs processing on the sequence of data. The reason is that the specified area on the cache is completely controlled by the software such that there is no possibility of arbitrary replacement of pre-fetched data in the specified area.

Even if data is discretely arrayed on the main memory, it is recorded in consecutive areas on the cache, so that unneeded data is not loaded in the cache memory 102 to render it possible to utilize the cache memory more efficiently.

On the other hand, since the pre-fetch in the present embodiment is realized by direct data transfer between the cache memory and the main memory, no cache mis-hit occurs in pre-fetching or when the program accesses the pre-fetched data to render it possible to suppress the latency in data accessing to a smaller value. Moreover, the pre-fetch of the large scale data in the present embodiment can be realized without conflicting with the processing by the processor core or cache control by the cache memory controller.

The operation of the memory access controller 103 storing, that is post-storing, the computed results stored in the cache memory 102 in the main memory device 104 in accordance with a specified rule is hereinafter explained.

The software executed on the processor core 101 executes the following two processing operations prior to executing the post-store. One of the operations is setting the information necessary for post-store in the pre-fetch/post-store circuit 108. The other is setting a flag for confirming the end of the post-store in a data area in the cache memory 102. First, the setting of the information necessary for post-store is explained. The information necessary for post-store comprises (i) information as to from which area of the cache memory 102 data is to be taken out for writing and (ii) information as to in which position in the main memory device 104 the data is to be written. The software sets the following information in the special register 112 of the pre-fetch/post-store circuit 108:

type of accessing (post-store);
virtual start address of data arraying on the main memory;
stride of data arraying on the main memory;
number of data;
units of data (bytes, words, etc);
data start position on the cache memory;
position of a post-store end confirmation flag; and post-store start permission bit.

As shown in the foregoing, the information necessary for post-store is analogous with the information necessary for pre-fetch. The regularity of the data array on the main memory indicates the stride of the address as in the case of the pre-fetch. If the value of address stride corresponds to one unit data, the updated address on the main memory is the consecutive address, with the data being post-stored in the consecutive area of the main memory. On the other hand, if the value of the address stride corresponds to two or more unit data, the target address for post-store becomes a discrete address to enable discrete data to be post-stored in discrete areas in the main memory.

The setting of the above information is issued as store instructions to the non-cache area under the instructions of the software operating on the processor core 101. The store instruction to the non-cache area is sent to the processor side interface 106 directly via the processor address bus 121 and the processor data bus 122 without the interposition of the cache memory controller 105. The processor side interface 106 discriminates, from the address specified over the processor address bus 121, whether or not the command is the data setting command to the special register 112. If the result of check is YES, the value is set in the special register 112 over the special register access bus 133.

The setting of the flag for confirming the end of the post-store is explained. The post-store in the e present embodiment is executed by the pre-fetch/post-store circuit 108 outside the processor core 101 in independent from the instruction stream being executed in the processor core 101. Thus, the software being executed on the processor core 101 needs to be constructed so that the writing in the specified area on the cache as the target of the post-store and reading from the physical address space as the target of post-store will be halted until the end of the execution of the post-store. Therefore, the software has to confirm the end of the post-store. For this confirmation, a flag on the cache memory 102 is used in the present embodiment, as at the time (in case) of pre-fetch execution. The software executed on the processor core 101 resets a flag set at a specified position on the cache prior to starting of the post-store. This specified position is a portion of the pre-fetch/post-store cache area. It is not updated automatically as a result of software execution. The setting of the flag is executed as memory accessing by the software.

The post-store start permitting bit of the special register 112 is a bit instructing the pre-fetch/post-store controller 114 to start the post-store. If this bit is set, start of the post-store is commanded to the pre-fetch/post-store controller 114 over the special register control line 140, and post-store is executed under its control. That is, the post-store start permitting bit is set after completion of setting of the other information for post-store. First, the pre-fetch/post-store controller 114 sends the information for post-store, as set on the special register 112, over the address command signal line 139 to the address generating and converting device 113.

The pre-fetch/post-store controller 114 commands data readout from a specified area in the cache memory 102 to the cache memory interface 111 over the cache memory interface control line 142. The cache memory interface 111 specifies a position on the cache memory 102 by the cache address bus 131 to read out one-line data 119 stored at the specified position over the cache data bus 132. The read-out data is stored in the store buffer 116 over the post store write bus 138. The pre-fetch/post-store controller 114 also adds the value of the store start position on the cache memory 102 recorded in the special register 112, by an amount corresponding to the line size, over the special register control line 140. This processing is repeated until a number of data equal to the number of designated data in the special register 112 is read out from the cache memory 102.

In parallel with the data readout from the cache memory 102, the pre-fetch/post-store controller 114 commands the address generating and converting device 113 to generate the post-store address on the main memory and address conversion from the virtual address to the physical address. First, the data array start virtual address on the main memory is converted to the physical address to generate a first post-store address. The generated address is sent over the pre-fetch/post-store address bus 134 to the main memory device side interface 107. The main memory device side interface 107 reads out the leading data on the store buffer 116 over the post-store write bus 136 to write the data in the post store address on the main memory device 104. The address generating and converting device 113 repeatedly performs the operation of sequentially adding the data arraying stride on the main memory to the virtual address to generate a post-store virtual address, which then is converted to the physical address. The operation of sequentially routing these physical addresses to the main memory device side interface 107 and writing data on the store buffer 116 at the specified positions is executed repeatedly. These processing operations are repeated a number of times equal to the number of data set on the special register 112.

When the writing in the main memory device 104 of the entire post-store data comes to a close, the pre-fetch/post-store controller 114 sets a flag confirming the end of the post-store. The flag confirming the end of the post-store has been set on the cache memory 102. The flag position is kept recorded on the special register 112. The pre-fetch/post-store controller 114 instructs the cache memory interface 111 to set the flag over the cache memory interface control line 142. The cache memory interface 111 sends data over the cache address bus 131 and the cache data bus 132 to the cache memory 102 to set the flag at the specified position. Finally, the pre-fetch/post-store controller 114 instructs the special register 112 to erase the post store information set on the special register 112.

The software, executed on the processor core 101, is able to confirm the end of the post-store by checking the flag as set on the cache memory 102.

Figure 4:
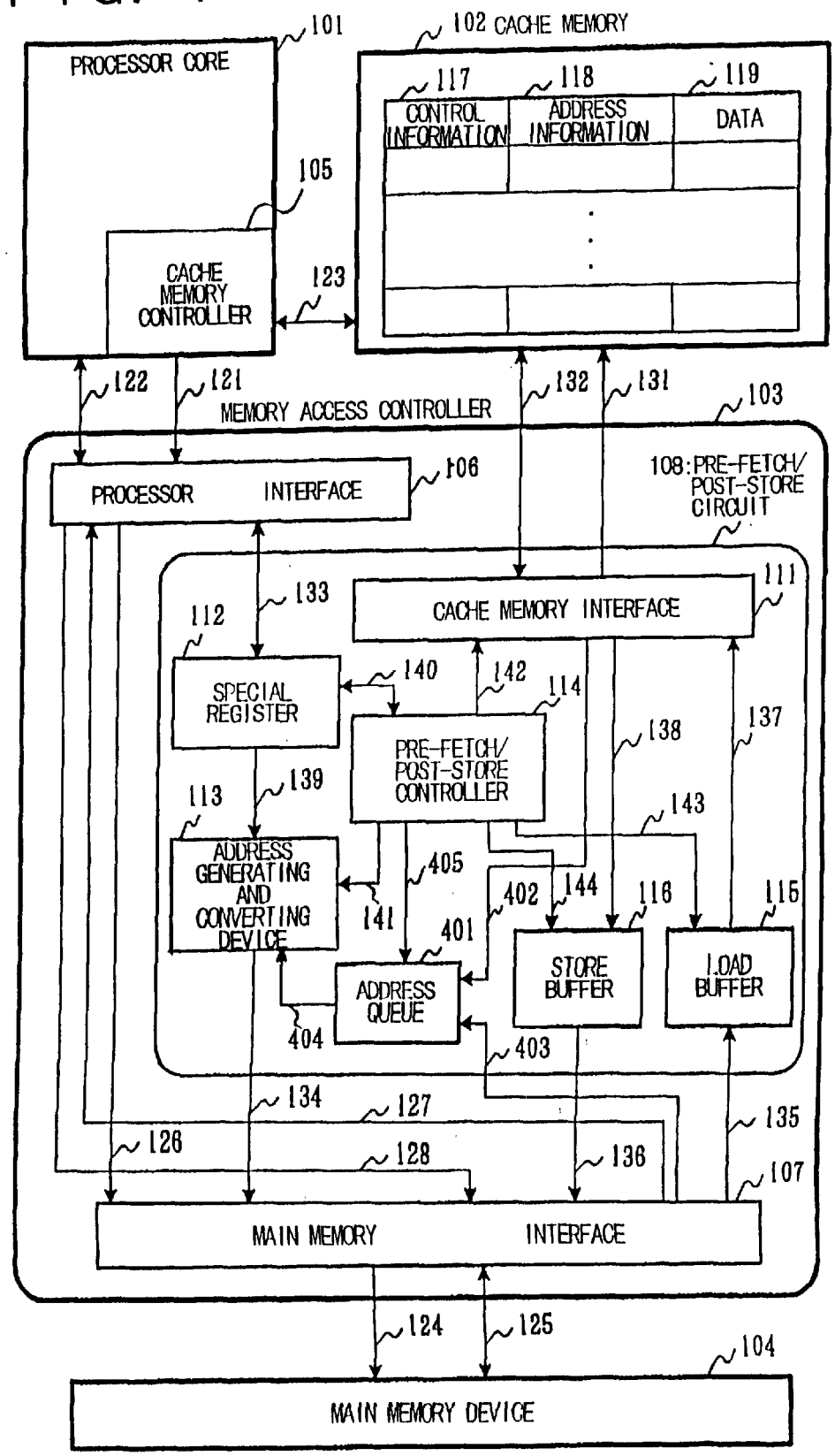
FIG. 4 is a block diagram showing essential portions of another information processing apparatus according to an embodiment of the present invention.

A modification of the present invention is now explained. FIG. 4 is a block diagram showing essential positions of an information processing apparatus according to another embodiment of the present invention. In the embodiment shown in FIG. 1, the reference address of data arranged at a fixed interval on the main memory device can be represented by the numerical formula. However, there occur a number of cases in calculations in scientific applications in which data reference positions are indicated by pointers, as in the FORTRAN program shown in FIG. 5. In such processing, it is not possible for the software to define the data reference rules by a numerical formula. In the embodiment of FIG. 4, in order to cope with this problem, there are specified by the software the store position of pointers indicating the data reference positions, and the pre-fetch/post-store circuit 108 automatically carries out the pointer readout, readout of data referred to by the pointer and data writing. This embodiment enables pre-fetch/post-store whose target data is indicated by indices with a slight modification In the embodiment of FIG. 4, an address queue 401 is newly provided in the embodiment of FIG. 1. The address queue 401 is a FIFO type queue for holding the contents of pointers indicating the data reference positions. The address queue 401 is able to receive the pointer contents from the cache memory interface 111 and the main memory device side interface 107 over pointer address buses 402, 403, respectively. The address queue 401 is also able to deliver the pointer contents over a pointer address bus 404 to the address generating and converting device 113. The address queue 401 is controlled by the pre-fetch/post-store controller 114 over an address queue control line 405. The pre-fetch operation in the present embodiment is now explained with reference to FIG. 4, mainly in connection with the difference from the embodiment of FIG. 1.

Figure 5:
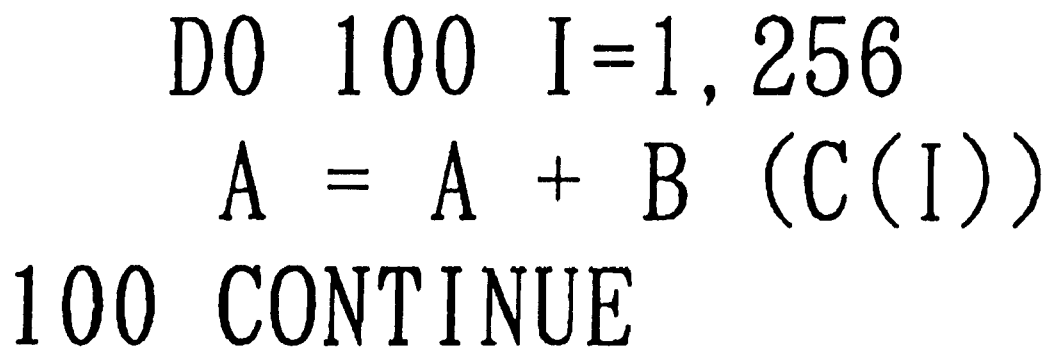

If the application program, in which the data reference position is indicated by a pointer, as in the program shown in FIG. 5, is executed on the processor core 101, the software sets the following information necessary for pre-fetch to the special register 112;

type of accessing (pre-fetch commanded by a pointer on a main memory);
 virtual start address of pointer arraying on a main memory;
 stride of pointer arraying on the main memory;
 number of data (pointers);
 units of data, such as bytes or words;
 store start position on the cache memory;
 position of the pre-fetch end confirming flag; and
 pre-fetch start permission bit.

It is noted that the regularity of the pointer arraying on the main memory denotes address stride. If the address stride value corresponds to one unit data, the address of the pointer becomes a contiguous address to enable pre-fetch in accordance with the consecutive pointers on the main memory. On the other hand, if the value of the address stride corresponds to two or more units data, the pointer address becomes a discrete address such that pre-fetch occurs in accordance with discrete pointers on the main memory.

If the array of the pointers (arraying of C(1) in FIG. 5) has already been pre-fetched in a specified area on the cache memory 102, the following information is set:

type of accessing (pre-fetch commanded by pointers on the cache memory);
 start position of pointer arraying on the cache memory;
 number of data (pointers);

units of data (bytes or words);
store start positions on the cache memory;
position of pre-fetch end confirmation flag; and
pre-fetch start permitting bit.

When the pre-fetch start permitting bit on the special register 112 is set, pre-fetch operation is started under control by the pre-fetch/post-store controller 114. If the pointer exists on the main memory, the physical address of the pointer is calculated by the address generating and converting device 113, as in the pre-fetch operation in the first embodiment, to load the pointer from the main memory device 104. The loaded pointer is input over the pointer address bus 403 to the address queue 401. If the pointer is held in the cache memory 102, the pre-fetch/post-store controller 114 instructs the cache memory interface 111 to read out the pointer. The cache memory interface 111 reads out one-line pointers and aligns the data on the word size basis, and inputs the aligned pointers over a pointer address bus 402 to the address queue 401. This processing is repeated until the number of pointers input to the address queue 401 and the number preliminary specified by the number of data (pointers) on the special register 112 come into agreement.

The pointers in the address queue 401 are fed over the pointer address bus 404 into the address generating and converting device 113. However, if the pointers are arrayed on the main memory, the address generating and converting device 113 is in use for generating physical addresses of the pointers. Therefore, the input of the pointers to the address generating and converting device 113 is halted until the totality of the pointers are loaded to the address queue 401. If the pointers have been loaded on the cache memory 102, the generating of the pre-fetch physical addresses from the pointer by the address generating and converting device 113 and the reading out of the pointers from the cache memory 102 are executed overlapped. The timing for the address queue 401 to input the pointers to the address generating and converting device 113 is commanded by the pre-fetch/post-store controller 114.

The address generating and converting device 113 generates pre-fetch virtual addresses, based on the pointers received via the pointer address bus 404, and converts the addresses into physical addresses. The converted physical addresses are sent over the pre-fetch/post-store address bus 134 to the main memory device side interface 107, to enable data to be read out from the main memory device 104. The read-out data is held in the load buffer 115. The ensuing processing is the same as that of the first embodiment.

If the data on the cache memory 102 is to be post-stored in the specified addresses, the pointers are input in similar manner to the address generating and converting device 113 over the address queue 401 and data to be post-stored is read out from the cache memory 102 and sequentially written in the addresses specified by the pointers. If, in the post-store, the pointers exist on the cache memory 102, readout of pointers and readout of data to be post-stored conflict with each other. Therefore, the totality of pointers are previously read out to the address queue 401 and subsequently the readout of the data to be post-stored is commanded to the cache memory interface 111. These commands are issued by the pre-fetch/post-store controller 114.

The meritorious effects of the present invention are summarized as follows.

According to the present invention, as described above, a sequence of data, arrayed consecutively or discretely on the main memory device so as to be used by the application program, can be copied into specified consecutive areas on a cache memory, by a pre-fetch/post-store circuit provided outside the processor core, without referring to or updating the information managed by the cache memory controller. Alternatively, data arrayed on the specified consecutive areas on the cache memory can be written in contiguous or discrete areas on the main memory device, by the pre-fetch/post-store circuit outside the processor core, without referring to or updating the information managed by the cache memory controller. In this manner, when the application program performs calculation (or processing) on the sequence of data, the data are present at all times on the cache memory, thus suppressing the average latency since the time the processor core has requested data until the time the data is actually used. Moreover, even if the sequence of data is arrayed discretely on the main memory device, only necessary data is copied into consecutive areas on the cache memory, so that it is possible to use the cache memory efficiently.

Since data is arrayed in a cache memory which is speedier than other memory device, it is possible to hide the latency of loading of the data into the registers with a smaller number of registers.

Also, since the pre-fetch/post-store is executed on a software-control led area on the cache memory, there is an advantage to evade expelling other data necessary for the software from the cache memory.

Moreover, since the pre-fetch/post-store is executed without rewriting the information supervised (managed) by the cache memory controller, without requiring the control by the cache memory controller, high-speed processing becomes possible, without being governed by the processing by the cache memory controller or by the low-speed interface between the processor core and the memory access controller.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An information processing apparatus, comprising:
   a main memory device;
   a cache memory to store a copy of data from selected locations of said main memory, said data stored in said cache memory including an address information indicating a main memory address at which said data is located and a control information indicating a state of said data;
   a processor including a cache memory controller to supervise data in said cache memory, said cache memory controller capable of transferring data from said main memory to said cache memory and from said cache memory to said main memory, said address information and said control information being updated by said processor and said cache memory controller; and
   a pre-fetch unit also capable of transferring data in said main memory device to said cache memory, wherein said pre-fetch unit makes said data transfer without having reference to nor updating said control information and said address information.

2. The information processing apparatus of claim 1,
   wherein said processor stores a main memory device physical address, said main memory device physical address indicative of a specified main memory physical space area associated with a specified area on said cache memory in a one-for-one correspondence.

3. The information processing apparatus of claim 2, wherein said pre-fetch unit copies consecutive or discrete data arrayed at a fixed interval on said main memory device into consecutive areas on said cache memory.

4. The information processing apparatus of claim 2, wherein said pre-fetch unit copies a sequence of data arrayed in addresses on said main memory device specified by pointers into consecutive areas on said cache memory, said pointers being consecutive or discrete data arrayed at a fixed interval on said main memory device.

5. The information processing apparatus of claim 2, wherein said pre-fetch unit copies a sequence of data arrayed in addresses on said main memory device, specified by pointers into consecutive areas on said cache memory, said pointers being data arranged consecutively in specified areas on said cache memory.

6. The information processing apparatus of claim 1, wherein said cache memory has a first input/output port and a second input/output port, said first input/output port being connected to said main memory device via said cache memory controller of said processor and said second input/output port being connected to said main memory device via said pre-fetch unit.

7. The information processing apparatus of claim 1, wherein said pre-fetch unit copies consecutive or discrete data arrayed at a fixed interval on said main memory device into consecutive areas on said cache memory.

8. The information processing apparatus of claim 1, wherein said pre-fetch unit copies a sequence of data arrayed in addresses on said main memory device specified by pointers into consecutive areas on said cache memory, said pointers being consecutive or discrete data arrayed at a fixed interval on said main memory device.

9. The information processing apparatus of claim 1, wherein said pre-fetch unit copies a sequence of data arrayed in addresses on said main memory device specified by pointers into consecutive areas on said cache memory, said pointers being data arranged consecutively in specified areas on said cache memory.

10. An information processing apparatus comprising:
a main memory device;
a cache memory to store a copy of selected data from said main memory, said cache memory including an address information indicating a main memory address at which said data is located and a control information indicating a state of said data;
a processor including a cache memory controller to supervise data in said cache memory, said cache memory controller capable of transferring data from said main memory to said cache memory and from said cache memory to said main memory, said address information and said control information being updated by said processor and said cache memory controller; and
a post-store unit also capable of transferring data in said cache memory to said main memory device, wherein said post-store unit makes said data transfer without having reference to nor updating said control information and said address information.

11. The information processing apparatus of claim 10, wherein said processor has a physical address space area, inclusive of a specified physical space area associated with a specified area on said cache memory in a one-for-one correspondence.

12. The information processing apparatus of claim 10, wherein said cache memory has a first input/output port and a second input/output port, said first input/output port being connected to said main memory device via said cache memory controller of said processor and said second input/output port being connected to said main memory device via said post-store unit.

13. The information processing apparatus of claim 10, wherein said post-store unit copies data arrayed in consecutive areas on said cache memory into addresses specified at a fixed interval on said main memory device.

14. The information processing apparatus of claim 10, wherein said post-store unit copies a sequence of data arrayed in consecutive areas on said cache memory into addresses on said main memory device specified by pointers, said pointers being consecutive or discrete data arrayed at a fixed interval on said main memory device.

15. The information processing apparatus of claim 10, wherein said post-store unit copies data arrayed in consecutive areas on said cache memory into addresses on said main memory device specified by pointers, said pointers being data arranged consecutively in specified areas on said cache memory.

16. An information processing apparatus comprising:
a main memory,
a cache memory;
a cache controller for said cache memory;
a processor to set a specified block of a plurality of blocks making up said cache memory as a pre-fetch/post-store cache area, to set a specified physical main memory space area of plural physical space areas of said main memory associated with said pre-fetch/post-store cache area as a pre-fetch/post-store physical space area, and to set portions of the plural physical main memory space areas of said main memory associated with said pre-fetch/post-store cache area other than the pre-fetch/post-store physical space area as an access-inhibited area to control said pre-fetch/post-store cache area as a cache area dedicated to said pre-fetch/post-store physical space area; and
a pre-fetch/post-store circuit to re-array a sequence of data existing consecutively or discretely on said main memory device as a sequence of consecutive data on said pre-fetch/post-store cache area directly without interposition of said cache controller,
wherein an application program employing the sequence of data existing consecutively or discretely on said main memory device accesses the re-arrayed data.

17. The information processing apparatus of claim 16, wherein said pre-fetch/post-store circuit re-writes the sequence of data on said pre-fetch/post-store cache area directly in consecutive or discrete sites on said main memory device, without interposition of a cache controller of said cache memory, after an end-of-use indication by said application program of the re-arrayed data.

18. An information processing process comprising:
providing an apparatus comprising a main memory device, a cache memory, and a processor to execute said information processing, said processor including a cache memory controller to supervise data in said cache memory and to update a control information and an address information associated with data in said cache memory; and providing a pre-fetch circuit and pre-fetching data in said main memory device by transferring the data in said main memory device to said cache memory using said pre-fetch circuit without having reference to nor updating said control information and said address information.

19. The information processing process of claim 18, further comprising:
providing in said processor a physical address space area to indicate a specified physical space area in said main memory associated with a specified area on said cache memory in a one-for-one correspondence.

20. The information processing process of claim 18, wherein said pre-fetching comprises copying consecutive or discrete data arrayed at a fixed interval on said main memory device into consecutive areas on said cache memory.

21. The information processing process of claim 18, wherein said pre-fetching comprises copying a sequence of data arrayed in addresses on said main memory device specified by pointers into consecutive areas on said cache memory, said pointers being consecutive or discrete data arrayed at a fixed interval on said main memory device.

22. The information processing process of claim 18, wherein said pre-fetching comprises copying a sequence of data arrayed in addresses on said main memory device specified by pointers into consecutive areas on said cache memory, said pointers being data arranged consecutively in specified areas on said cache memory.

23. An information processing process comprising:
providing an information processing apparatus comprising a main memory device, a cache memory, and a processor to execute said information processing, said processor including a cache memory controller to supervise data in said cache memory and to update a control information and an address information associated with data in said cache memory; and
providing a post-store unit and transferring, via said post-store unit, data in said cache memory to said main memory device without having reference to nor updating said control information and said address information.

24. The information processing process of claim 23, further comprising:
providing in said processor a physical address space area to indicate a specified physical space area in said main memory associated with a specified area on said cache memory in a one-for-one correspondence; and
by using said post-store unit, directly transferring data between said cache memory and the main memory device, under a command for memory copying for said specified physical space area, without obstructing execution of processing by said processor.

25. The information processing process of claim 23, further comprising:
by using said post-store unit, copying data arrayed in consecutive areas on said cache memory into addresses specified at a fixed interval on said main memory device.

26. The information processing process of claim 23, further comprising:
by using said post-store unit, copying a sequence of data arrayed in consecutive areas on said cache memory into addresses on said main memory device specified by pointers, said pointers being consecutive or discrete data arrayed at a fixed interval on said main memory device.

27. The information processing process of claim 23, further comprising
by using said post-store unit, copying data arrayed in consecutive areas on said cache memory into addresses on said main memory device specified by pointers, said pointers being data arranged consecutively in specified areas on said cache memory.

28. An information processing process, comprising:
in a processor, (a) setting a specified block of a plurality of blocks making up a cache memory as a pre-fetch/post-store cache area, (b) setting a specified physical main memory space area of plural physical main memory space areas associated with said pre-fetch/post-store cache area as a pre-fetch/post-store physical space area, and (c) setting portions of the plural physical main memory space areas other than the pre-fetch/post-store physical space areas as an access-inhibited area to control said pre-fetch/post-store cache area as a cache area dedicated to said pre-fetch/post-store physical space area;
providing a pre-fetch/post-store circuit; and
by using said pre-fetch/post-store circuit, re-arraying a sequence of data existing consecutively or discretely on said main memory device as a sequence of consecutive data on said pre-fetch/post-store cache area directly without interposition of a cache controller of said cache memory,
wherein an application program employing the sequence of data existing consecutively or discretely on said main memory device accesses the re-arrayed data.

29. The information processing process of claim 28, further comprising:
by using said pre-fetch/post-store circuit, re-writing the sequence of data on said pre-fetch/post-store cache area directly in consecutive or discrete sites on said main memory device, without interposition of a cache controller of said cache memory, after an end-of-use indication by said application program of the re-arrayed data.

30. An information process apparatus, comprising:
a processor;
main memory;
a cache memory to store a copy of data at selected locations of said main memory, wherein said data stored in said cache memory includes an address information indicating a main memory address at which said data is located and a control information indicating a state of said data,
a cache memory controller to transfer data from said cache memory to said main memory and from said main memory to said cache memory, wherein each data transfer by said cache memory controller includes a reference to and an updating of said address information and said control information associated with data of said data transfer; and
a pre-fetch/post-store circuit to transfer data from said cache memory to said main memory and from said main memory to said cache memory, wherein each data transfer by said pre-fetch/post-store circuit includes neither said reference to nor said updating of said address information and said control information associated with data of said data transfer.

31. The information process apparatus of claim 30, wherein said processor uses said cache memory controller to initially set up a data block in said cache memory, said initial data block having a predetermined size and a corresponding address information and control information, and said processor subsequently uses said pre-fetch/post-store circuit to transfer data between said cache memory and said main memory in units of said block size.

32. An information processing method for an apparatus having a processor, a main memory, and a cache memory associated with said processor, said method comprising:

having said processor initially set up a data block in said cache memory using a cache memory controller associated with said cache memory, said initial data block having a predetermined size and being set up with an initial corresponding address information and control information, said address information indicating a main memory address at which said data is located and a control information indicating a state of said data; and having said processor subsequently use a pre-fetch/post-store circuit associated with said cache memory to subsequently transfer data between said cache memory and said main memory in units of said block size, wherein said subsequent data transfers make no changes to said initial address information and control information.

\* \* \* \* \*